United States Patent

Dybdal et al.

(10) Patent No.: US 6,731,240 B2
(45) Date of Patent: May 4, 2004

(54) METHOD OF TRACKING A SIGNAL FROM A MOVING SIGNAL SOURCE

(75) Inventors: Robert B. Dybdal, Palos Verdes Estates, CA (US); Denny D. Pidhayny, Los Angeles, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 10/097,091

(22) Filed: Mar. 11, 2002

(65) Prior Publication Data

US 2003/0169201 A1 Sep. 11, 2003

(51) Int. Cl.⁷ .......................... H01Q 3/00; H04B 7/185
(52) U.S. Cl. ........................ 342/359; 342/354
(58) Field of Search ................. 342/354, 359, 342/367, 426, 428, 430

(56) References Cited

U.S. PATENT DOCUMENTS

| | | | |
|---|---|---|---|
| 3,699,324 A | * 10/1972 | Iliff et al. | 342/426 |
| 5,043,737 A | 8/1991 | Dell-Imagine | |
| 5,077,560 A | 12/1991 | Horton et al. | |
| 5,077,561 A | 12/1991 | Gorton et al. | |
| 5,163,176 A | 11/1992 | Flumerfelt et al. | |
| 5,227,806 A | 7/1993 | Eguchi | |
| 5,274,382 A | 12/1993 | Wills et al. | |
| 5,592,176 A | 1/1997 | Vickers et al. | |
| 5,729,240 A | * 3/1998 | Bourgeois | 342/359 |
| 5,828,337 A | 10/1998 | Aoshima et al. | |
| 5,952,962 A | 9/1999 | Dybdal | |
| 6,252,553 B1 | * 6/2001 | Solomon | 343/700 MS |
| 6,313,786 B1 | * 11/2001 | Sheynblat et al. | 342/357.02 |
| 2003/0048222 A1 | * 3/2003 | Schmid et al. | 342/359 |
| 2003/0052825 A1 | * 3/2003 | Rao et al. | 343/757 |

OTHER PUBLICATIONS

Adaptive sampling frequency for sampled–data control systems, R. Dorf et al., IRE Transactions on Automatic Control, vol. 7(1 p. 38–47, Jan. 1962.*

Adaptive beam pointing control of a phased array radar using the AIMM algorithm, M. Efe et al., IEE Colloquium on Target Tracking and Data Fusion (Digest No.: 1996/253), p. 11/1–11/8, Nov. 7, 1996.*

Target tracking with adaptive sampling intervals using multiple maneuver model, A. Yanbe et al., Proceedings of the 40th SICE Annual Conference, International Session Papers, p. 271–276, 2001.*

* cited by examiner

*Primary Examiner*—Thomas H. Tarcza
*Assistant Examiner*—F Mull
(74) *Attorney, Agent, or Firm*—Henricks, Slavin & Holmes LLP (57) ABSTRACT

A method of tracking a signal from a moving signal source including commanding angular offsets to control an antenna to track a signal from a moving signal source taking into consideration directional changes of the signal and comparisons between actual and estimated trajectories of the moving signal source.

22 Claims, 6 Drawing Sheets

METHOD OF TRACKING A SIGNAL FROM A MOVING SIGNAL SOURCE

STATEMENT OF GOVERNMENT INTEREST

The invention was made with Government support under contract F04701-93-C-0094 by the Department of the Air Force and contract 50-SPNA-0-00012 by the National Oceanic & Atmospheric Administration. The Government has certain rights in the invention.

BACKGROUND OF THE INVENTION

Different methods for antenna tracking have been devised for a variety of applications and system requirements. In a process commonly referred to as "program track," the antenna pointing relative to the signal direction is known with sufficient precision that the antenna is commanded in a open loop manner to point at the signal source and follow known changes in the signal source direction. At the other extreme, "closed loop monopulse tracking" designs are implemented in high performance tracking radars to determine the angular location of a target with as high a precision as possible. In this case, the target trajectories are unknown, and indeed the purpose of the tracking radar is to determine their trajectories. Unfortunately, this angular precision in locating radar targets is accompanied by significant design and calibration complexity and high cost. In between these extremes lies another tracking method, referred to as "step track," that starts with an estimated signal source direction to derive an open loop command to point in the estimated signal direction and then verifies correct antenna pointing. The step track method verifies correct antenna pointing by commanding angular offset positions about the nominal pointing direction and sensing the signal power at each commanded position. The differences in these measured signal values are processed to correct the antenna pointing from its nominal estimated position to one that aligns the peak antenna pattern level with the signal to achieve the highest signal level from the system.

The step track technique is commonly used for antenna alignment with signals whose positions are relatively fixed such as earth terminals used with geosynchronous satellites. Communication satellites (unlike radar targets) provide a steady signal level over the time periods needed for antenna pointing alignment. In addition, the satellite trajectory is well known within the accuracy of the ephemeris of the satellite. The user determines an estimated antenna pointing direction from knowledge of his location and the orbital location of the satellite. The antenna is then sequentially moved plus and minus for a predetermined amount in the azimuth direction and the power received at each point is measured. If the power levels are identical for both angular offsets, the antenna is correctly aligned with the signal. If the power levels differ at the two angular offsets, then the power level difference can be used to correct the antenna pointing. Having correctly determined the pointing alignment in the azimuth plane, the process can be repeated in the elevation plane. Such a process is commonly used for simple antennas that are used, for example, for direct broadcast television (TV) reception. These antennas have relatively broad beamwidths in comparison with the variation in the position of the satellite so that the antenna once aligned can be fixed in place.

Other applications, however, exist where the signal source direction dynamically varies and the antenna must follow this dynamic variation to maintain signal reception. The variation in the signal direction can also be sufficiently dynamic that the assumption of a static signal direction during the required measurement time for the conventional step track method is no longer valid. Because the signal source direction changes during the measurement time, valid measurement of the power levels at the offset positions cannot be made and hence the antenna position cannot be aligned with the signal direction. An example of this situation occurs with meteorological earth resource satellites that are in a relatively low earth orbit to obtain high resolution of meteorological features and have sufficient orbital motion to obtain global coverage of weather events. This present invention addresses the need to provide an accurate, reliable method of aligning an antenna with a signal source and following its dynamic motion while the signal is in view of the antenna.

SUMMARY OF THE INVENTION

According to an embodiment of the present invention, a method of tracking a moving signal source is realized in a tracking technique that exploits estimated variations in the dynamic motion of the signal source. In an embodiment of the present invention, open loop commands are relied upon for antenna positioning and received signal levels in offset positions are measured to derive data for correcting antenna pointing in consideration of a predetermined estimate of the time variation of the signal direction. Open loop commands reposition the antenna to offset positions in such a way that the pointing takes into account the position of the signal source at different times in its angular variation. Unlike the conventional step track method, the signal sampling of the angular offsets varies with the rate at which the signal direction varies. For this reason, the present invention can be referred to as "rate correction step track" because the dynamics of the signal directional changes are incorporated into the antenna tracking method. In an embodiment of the present invention, signal power measurements are used not only to derive corrections to the antenna pointing but also in reaching decisions on when to revalidate the step track alignment. Unlike the conventional step track technique where the angular offsets are in fixed orthogonal directions, e.g. azimuth and elevation, in an embodiment of the present invention, the angular offsets are along and orthogonal to the direction of the signal source motion, i.e., in-track and cross-track.

In an embodiment of the present invention, first it is verified that the antenna position accurately follows the commanded values and follows the positions given in a test trajectory. The next step uses an ephemeris trajectory and aligns the antenna with the satellite signal as the satellite clears the horizon. The offsets after this alignment serve to verify the correctness of the ephemeris trajectory at this point of the trajectory. The ephemeris trajectory is further validated at selected intervals during the satellite pass and is used to correct the pointing at these points along the trajectory. The differences between the ephemeris trajectory and the actual trajectory are noted and can subsequently be used to update the ephemeris trajectory. The signal sampling used in this process is taken in the in-track and cross-track coordinates of the antenna trajectory. Subsequent to a particular satellite pass, the differences between the actual and ephemeris trajectories can be used to validate the correctness of the ephemeris values and to identify the need for further adjustments to ephemeris accuracy and/or updating to current values. Thus, an embodiment of the present invention provides means for maintaining the antenna tracking when errors exist in the ephemeris trajectory and for determining required refinements in ephemeris values, thereby facilitating implementation of an open loop tracking technique for signal sources having a dynamic motion variation.

In accordance with an embodiment of the present invention, a method of tracking a signal from a moving signal source includes: processing variations in a received signal from a moving signal source to determine signal peak alignment values; and processing the signal peak alignment values and an a priori estimate of motion of the moving signal source to control an antenna to track the received signal. In one embodiment, the a priori estimate of motion includes position and rate estimates from an estimated ephemeris trajectory. In one embodiment, an open loop control system is used to control the antenna. In one embodiment, a rate programmer is used to control the antenna. For example, the rate programmer controls the antenna with in-track acceleration commands and/or differences between a measured trajectory and an estimated ephemeris trajectory are used to control the rate programmer. In one embodiment, the method further includes performing a tracking verification at a sample rate determined in consideration of the a priori estimate of motion, such that trajectory portions with more dynamic signal variations are sampled more frequently. In one embodiment, the method further includes using a step track measurement process to correct errors in the a priori estimate of motion.

In accordance with another embodiment of the present invention, a method of tracking a signal from a moving signal source includes performing an initial acquisition of a signal from a moving signal source by: positioning an antenna at a nominal azimuth angle and at an initial elevation angle relative to a horizon where the moving signal source is expected to appear, the initial elevation angle being selected such that a null between a main beam and a first sidelobe of the antenna is aligned with the horizon; and repositioning the antenna by providing azimuth offset commands corresponding to angular increments about the nominal azimuth angle, until the signal has been acquired by the antenna's receiver using the antenna. In one embodiment, the angular increments in the signal sampling are a portion of a beamwidth of the antenna dependent on the tracking sensitivity coefficient constrained by the signal margin. In one embodiment, the method further includes employing a guard antenna to verify a main beam acquisition.

In accordance with another embodiment of the present invention, a method of tracking a signal from a moving signal source includes employing an open loop control system to steer an antenna by commanding angular offsets along and orthogonal to a direction of motion of a moving signal source. In one embodiment, the open loop control system is configured to implement an open loop step track process.

In accordance with another embodiment of the present invention, a method of tracking a signal from a moving signal source includes commanding angular offsets to control an antenna to track a signal from a moving signal source taking into consideration directional changes of the signal and comparisons between actual and estimated trajectories of the moving signal source. In one embodiment, a sampling of the angular offsets varies with a rate of change of signal direction. In one embodiment, the angular offsets are commanded in in-track and/or cross-track coordinates. For example, cross-track angular offsets are determined by open loop commanding the antenna about a cross-track direction. For example, in-track angular offsets are determined by open loop commanding the antenna ahead of the moving signal source and making a signal power measurement, and then open loop commanding the antenna behind the moving signal source correcting the in-track angular offset for an amount the moving signal source would proceed in an in-track direction during the intervening time. As another example, in-track angular offsets are determined by open loop commanding the antenna in front of the moving signal source, and slowing a tracking speed to let the moving signal source traverse an in-track antenna pattern and realign the in-track coordinate based on power variations in the signal. In one embodiment, the method further includes sampling the signal to validate a correctness of the estimated trajectory. For example, the signal is sampled depending upon an angular rate associated with the estimated trajectory at a particular point along the estimated trajectory. As a second example, the signal is sampled more frequently during portions of the estimated trajectory where signal trajectory dynamics are high. As a third example, the signal is sampled more frequently if deviations between the actual and estimated trajectories are determined.

The above described and many other features and attendant advantages of the present invention will become apparent as the invention becomes better understood by reference to the following detailed description when considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION

The following is a detailed description of the best presently known mode of carrying out the invention. This description is not to be taken in a limiting sense, but is made merely for the purpose of illustrating the general principles of the invention.

Figure 1:
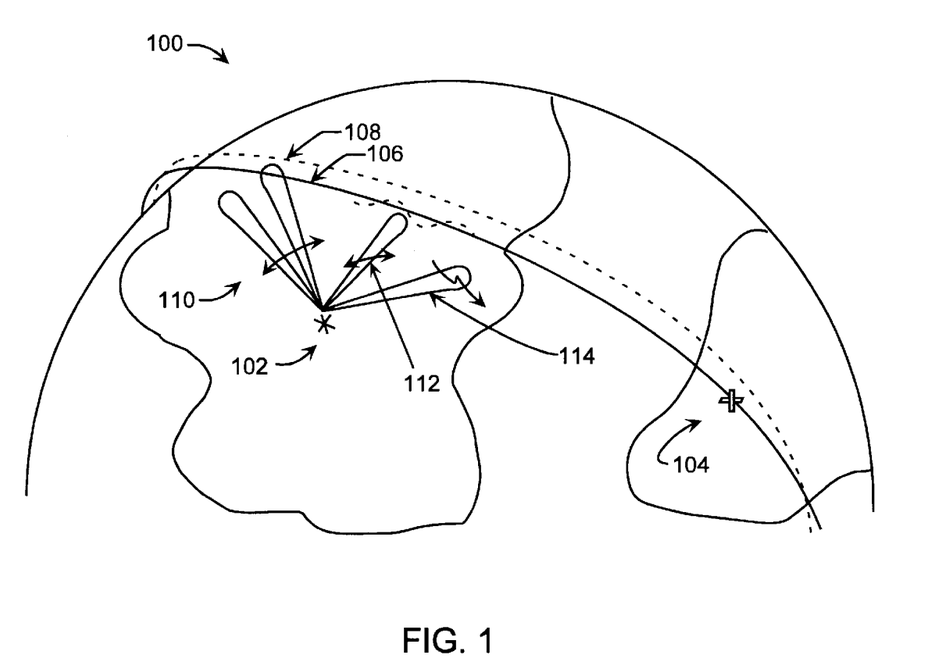
FIG. 1 illustrates an exemplary implementation of the present invention for a receiver/antenna assembly and a signal source in an operating environment.

FIG. 1 illustrates an exemplary operating environment 100 within which operate a receiver/antenna assembly 102 and a signal source 104. The receiver/antenna assembly 102 is located, for example, on the surface of the earth. The signal source 104 comprises, by way of example, a satellite orbiting the earth along an actual orbit trajectory 106. An estimated orbit trajectory 108 (discussed below) is shown as a dashed line. An arrow 110 identifies an illustration of an exemplary "initial acquisition" according to the present invention. An arrow 112 identifies an illustration of an exemplary "cross track verification" according to the present invention. An arrow 114 identifies an illustration of an exemplary "in track verification" according to the present invention.

Figure 2:
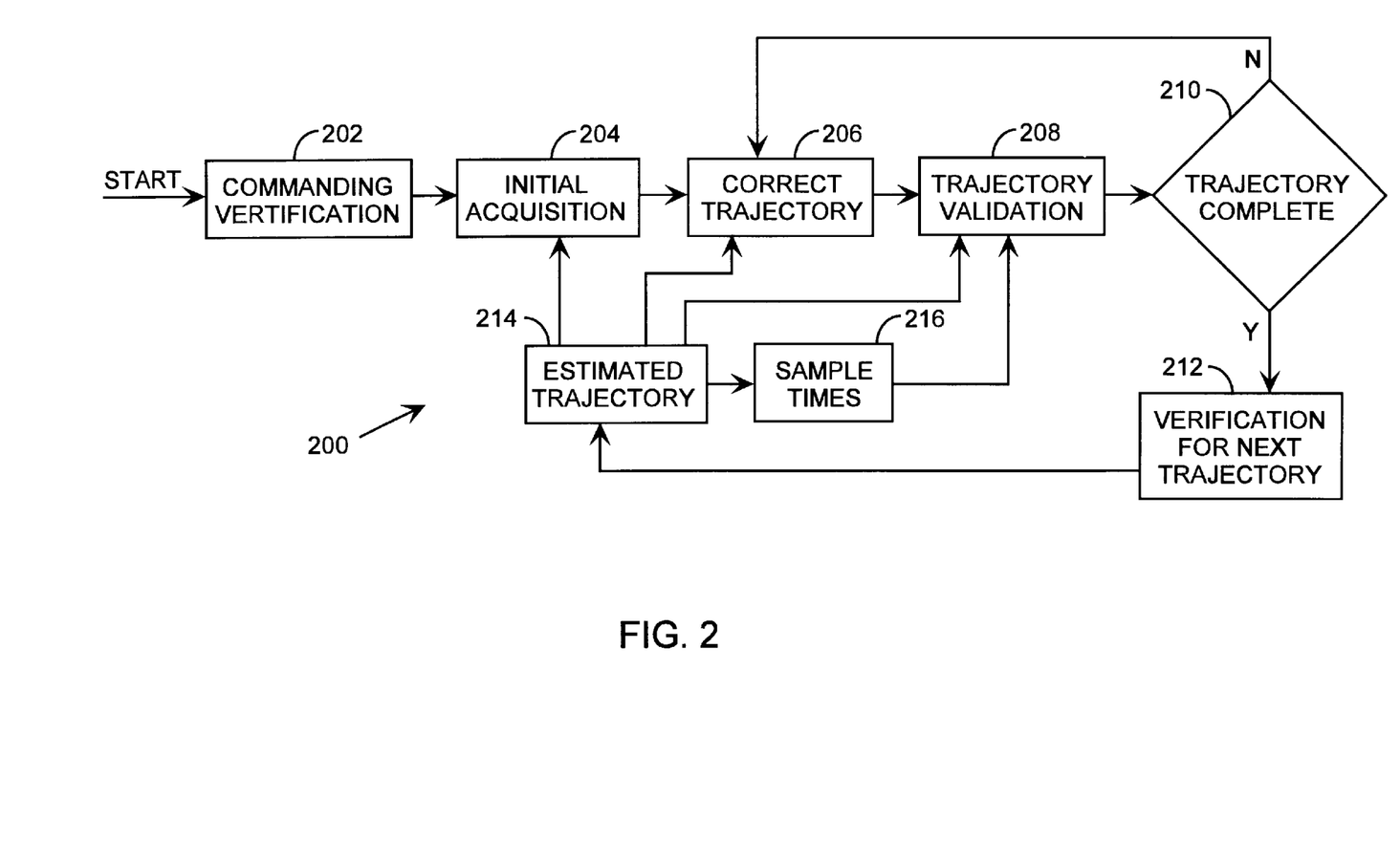
FIG. 2 is a flow diagram of an exemplary method of tracking a moving signal source according to the present invention.

FIG. 2 is a flow diagram of an exemplary method 200 of tracking a moving signal source according to the present invention. Prior to the actual tracking event, step 202 comprises employing a test trajectory to verify that the antenna accurately responds to pointing commands. The commanding verification 202 is further discussed with reference to FIG. 3. Next, an initial acquisition step 204 is performed. For a satellite application, the time variation of the position of the satellite is described by the ephemeris. The satellite ephemeris and the location of the earth terminal can be used to obtain an estimated time trajectory 214 of the motion of the antenna in azimuth and elevation while the satellite is in view of the antenna. The satellite is acquired both in terms of receiver acquisition of the signal and antenna alignment with the satellite position. Additionally, the earth terminal is capable of displaying the instantaneous position of the antenna azimuth and elevation variations. The initial acquisition step 204 is further discussed with reference to FIG. 5. Next, a correct trajectory step 206 and a trajectory validation step 208 are performed. A comparison between the ephemeris prediction of the antenna trajectory and the actual antenna trajectory facilitates determining the accuracy of the ephemeris trajectory and maintaining pointing at the satellite notwithstanding errors in the estimated trajectory. The trajectory validation step 208 is further discussed with reference to FIG. 6.

Figure 3:
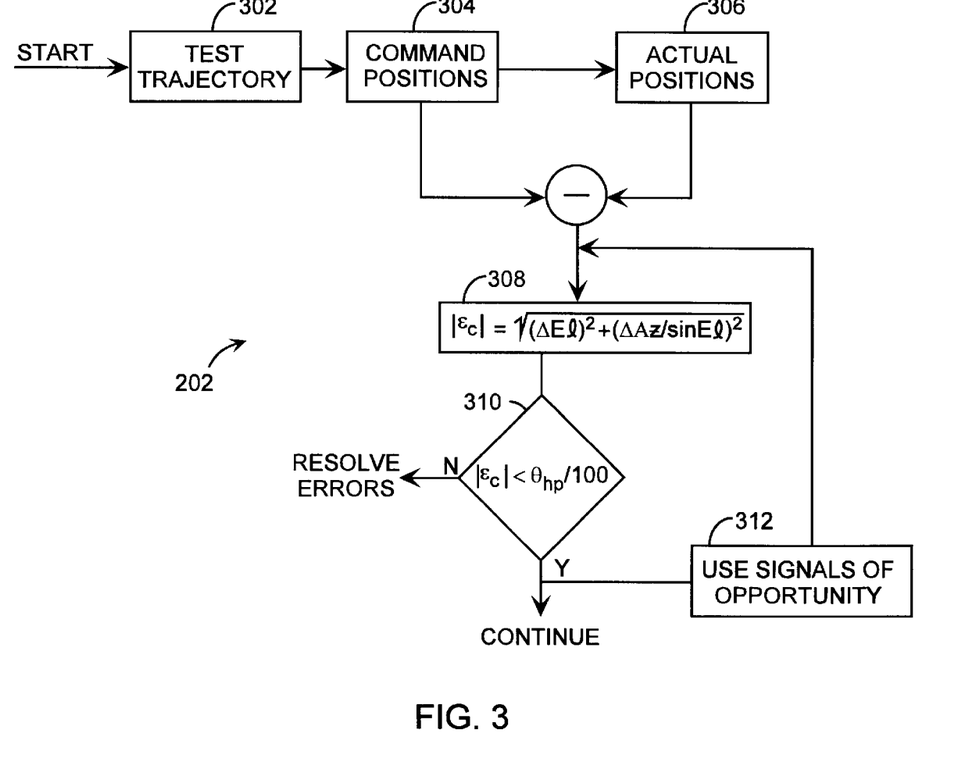
FIG. 3 is a flow diagram of an exemplary commanding verification process according to the present invention.

FIG. 3 is a flow diagram of an exemplary commanding verification process 202 according to the present invention. Generally, this process verifies the ability of the antenna to accurately respond to commanded positions. In the illustrated exemplary process, a test trajectory 302 is used to determine the antenna pointing response over a range of angles; and because the commanding accuracy of the antenna is being measured, the tolerances for the errors are fairly stringent. Command positions 304 and actual positions 306 are differenced and errors in commanding the antenna position are determined as indicated at executable block 308. At decisional diamond 310, a determination is made as to whether these errors are sufficiently small. If not, errors are resolved and tighter bounds are used. In the illustrated exemplary commanding verification process, step 310 involves determining whether the error in commanding the antenna position is less than a threshold, for example, 1/100 of the antenna beamwidth. Selection of the value of 1/100 of the antenna beamwidth for this tolerance provides that the errors in commanding the antenna position are 1/10 of the normal overall tracking accuracy of 1/10 of the antenna beamwidth. In this way, the errors in commanding the antenna position provide only a small contribution to the overall system pointing errors. For communication applications, the accuracy goal for antenna tracking is 1/10 of the antenna beamwidth so that pointing losses are limited to 0.1 dB.

Following this verification of the commanding accuracy, the estimated antenna trajectory as derived from the ephemeris is used in place of the test trajectory. This step of the process is particularly important for transportable antenna systems that are used in a new location. This commanding verification facilitates the elimination of any position bias values, e.g., the direction of true north, which would affect the accuracy of antenna pointing. For well-established sites, e.g., permanent installations on buildings, this step can be used on initial checkout and for routine verification of equipment replacement and diagnostics.

The illustrated exemplary antenna pointing verification 202 also takes advantage of available signals of opportunity 312. For example, other satellites in geosynchronous orbits provide downlink signals in well-established locations. These signals can be used for measurements of antenna pointing accuracy, and the pointing accuracy can be measured using conventional step track procedures. Similarly, radio sources as used for antenna G/T measurements have well known locations. The sun, for example, has a relatively high flux density output so that small antennas can be characterized. The motion of the sun is very well established, and this motion is useful in measuring the pointing accuracy over a range of azimuth and elevation angles.

The satellite ephemeris and the user location provide the basis for the estimated ephemeris trajectory 214 (FIG. 2). If the ephemeris and the users location were ideally precise, then the antenna would likewise be ideally aligned with the signal. In such a case, program track would also be entirely adequate for antenna tracking. However, in practice, the estimated trajectory is subject to errors in ephemeris values. Consequently, the rate corrected step track method of the present invention provides a way to validate the correctness of the ephemeris-generated antenna trajectory. The accuracy of ephemeris values is limited initially by the accuracy of the sensors and data processing used to produce the values. The accuracy of the ephemeris degrades further with the passage of time because of orbital perturbation and, in some cases, thrusting that is used to maintain orbital positions. The present invention provides means for validating the accuracy of antenna trajectories and for maintaining accurate pointing to satellites.

Figure 4:
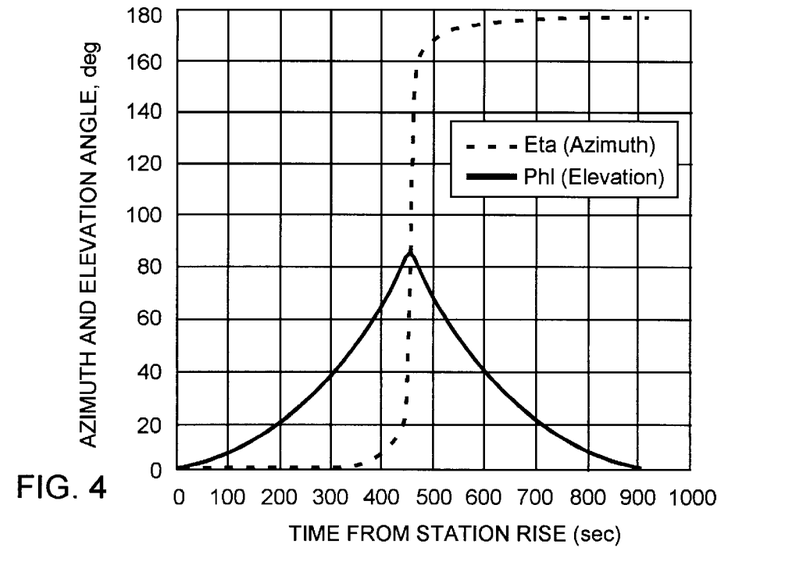
FIG. 4 is a plot of an exemplary ephemeris trajectory.

FIG. 4 is a plot of an exemplary ephemeris trajectory. The trajectory illustrated in this figure is an example of a high elevation angle (85°) pass for a 450 nmi orbit typically used by meteorological satellites. This trajectory defines the time variation of the azimuth and elevation angles that the antenna is estimated to follow while it is in view of the earth terminal. The initial azimuth angle, at a time at which the satellite comes into view over the horizon, and the variation after that time are shown. The most rapid variation of this trajectory occurs in the azimuth coordinate and the variation in elevation angle is less dynamic. The estimated trajectory 214 (FIG. 1) can be prepared well before the satellite tracking is performed.

Figure 7:
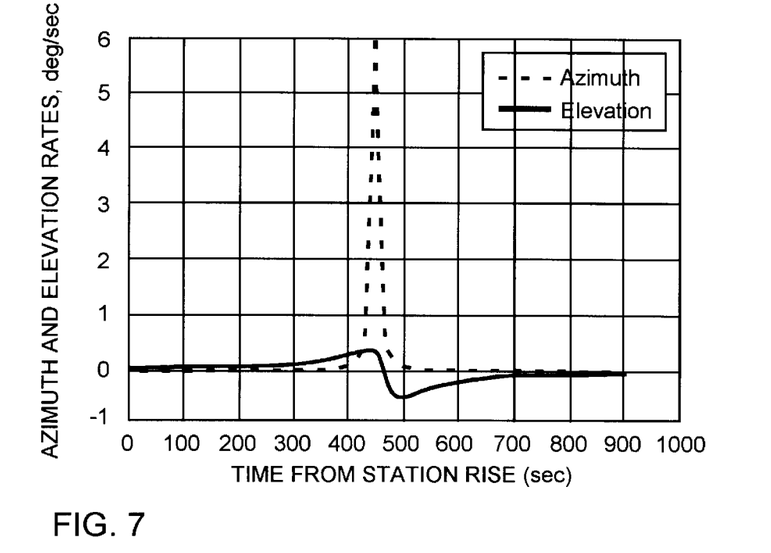
FIG. 7 is a plot of the rate of change of the ephemeris trajectory of FIG. 4.

The ephemeris provides an estimated time and azimuth angle at which the satellite will clear the horizon when it comes into view of the earth station. The angular rates at which the azimuth and elevation angles are changing are minimal at this point. See, e.g., FIG. 7, which is a plot of the rate of change of the ephemeris trajectory of FIG. 4. According to the present invention, acquisition of the satellite is accomplished in the following manner: the antenna prior to the satellite is boresighted above the horizon and moved in angular offsets in azimuth about the estimated azimuth angle to determine the arrival direction over its range of uncertainty.

Figure 5:
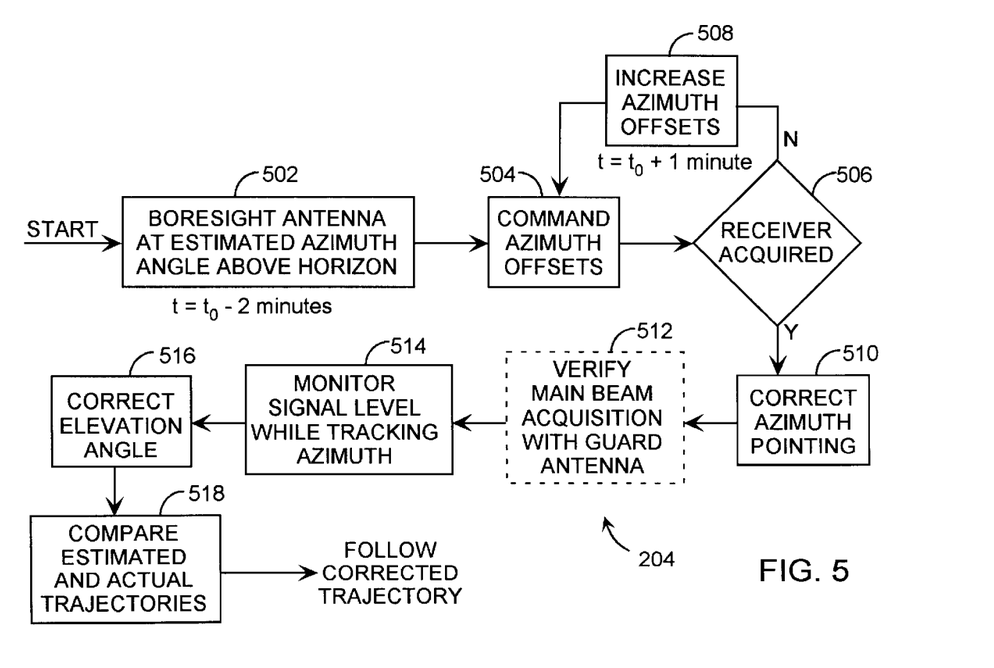
FIG. 5 is a flow diagram of an exemplary initial acquisition process according to the present invention.

FIG. 5 is a flow diagram of an exemplary initial acquisition process 204 according to the present invention. Generally, this satellite acquisition process has two components. The first is acquisition of the signal by the receiver; for example, a carrier loop is searched in frequency until the Doppler shifted carrier frequency is detected. The second component of the acquisition is alignment of the antenna with the satellite to obtain the maximum signal.

At step 502, the antenna is initially positioned at the nominal azimuth angle prior to the satellite arrival. The antenna is also purposely offset above the horizon. At step 504, the antenna is sequentially offset by predetermined, e.g.

½ of the antenna beamwidth, angular amounts in plus and minus directions about the nominal azimuth value. During this time interval, the status of the receiver acquisition is monitored. At decisional diamond 506, it is determined whether the receiver has been acquired. If the determination is negative, at step 508 the azimuth offsets are increased and then step 504 is repeated. When the receiver has been acquired, signal levels at the azimuth-offset positions are measured. The signal levels at these two positions permit correction of the azimuth values at step 510. The corrected azimuth values are then followed while monitoring the signal level at step 514 as the elevation angle of the satellite increases. The elevation angle increase of the satellite is accompanied by a change in the signal level that follows the antenna gain variation in elevation. The elevation angle is fixed at this point and the antenna is tracking in azimuth. The signal variation with elevation angle provides a sampled set of data that can be used to align the antenna in the elevation direction at step 516. Thus, the antenna alignment in azimuth and elevation angle can be corrected. The reason for initially boresighting the antenna above the horizon is to minimize the effects of multipath. If the antenna were repositioned in elevation as would be done in the conventional step tracking technique, multipath could distort the power measurements degrading the ability to properly align the antenna in elevation angle.

The choice of the initial elevation angle can also be made in consideration of tradeoffs specific to the application. Multipath can be reduced by aligning the antenna so that the null between the main beam and the first sidelobe is aligned with the horizon. However, such an alignment also reduces the low elevation angle reception of the signal. Thus, signal to noise considerations also enter into the initial elevation angle selection. For low orbiting satellites, the data transfer is limited by the time duration when the satellite is in view. Thus, a rapid acquisition in both the receiver's spectral detection and the antenna's spatial alignment is desirable to maximize the amount of data that can be collected when the satellite is in view.

When narrow beamwidth antennas (such as antennas with beamwidths less than 1°) are used with this technique, the possibility exists that the receiver can acquire the signal when an antenna sidelobe is pointed at the signal rather than the main beam. Because the beamwidth of the sidelobes is about half as wide as that of the main beam, the step track procedure will detect this situation because the power levels at the two angular offsets will be inconsistent, or if a fit to the main beam is used with the sampled points during antenna movement, the differences in the main beam and sidelobe beamwidths will become apparent. Thus, optionally at step 512 a separate guard antenna, see, U.S. Pat. No. 5,952,962 to Robert B. Dybdal, incorporated herein by reference, mounted on the main antenna can be used to verify main beam acquisition. By way of example, such a guard antenna is 1/10 the size of the main antenna and consequently has a beamwidth that is ten times as large. Its peak gain level is also about 20 dB lower than the main antenna. As a result, the main beam of the guard antenna spans several of the sidelobes surrounding the main beam and has a gain level that is comparable to the peak sidelobe gain levels of the main antenna. In operation, a comparison of the received signal levels between the main and guard antennas provides a rapid means of determining the possibility of signal alignment with the sidelobes of the main antenna. If the signal received from the main antenna is substantially higher than the signal received by the guard antenna, the signal has the desired alignment within the main antenna beam as a consequence of the larger main beam gain level. However, if the signal levels of the main antenna are comparable or lower than the guard antenna, sidelobe alignment is indicated. The alignment of the main beam is achieved by commanding azimuth movement on either side of the position of the antenna and monitoring the signal level difference between the guard and main antenna until main beam alignment is indicated by a substantially higher signal level.

The correction in angle, $\theta_c$, can be related to the ratio of the signal amplitudes at the two angular offset positions R as $$\theta_c = -(\theta_{hp}^2/4K\theta)\ln R$$

where $\theta_{hp}$ is the half power beamwidth of the antenna, K equals 1.3816 as obtained from evaluating a Gaussian function fit to the main beam at the half power point, $\theta$ is the angular offset from the nominal pointing direction, and the angles are referenced to the boresight of the antenna. In an embodiment of the present invention, $\theta$ is the angular offset from the nominal pointing direction in either the in-track or cross-track plane and, for example, can be used in step track measurements in either of the two orthogonal planes.

The choice for the angular offsets can involve tradeoffs. If a small beam offset is used, the measurement sensitivity suffers because the peak of the antenna beam is relatively flat. A larger beam offset positions the antenna pattern at a point at which the pattern has a slope that increases measurement sensitivity, but the received signal level at the offset positions is reduced because the antenna is not aligned with the beam peak. A general expression for the angular accuracy of this step track technique is $$\sigma_\theta/\theta_{hp} = -(\theta_{hp}/2K\theta)\sigma_a$$

where $\sigma_\theta$ and $\sigma_a$ are the standard deviations of the angular accuracy and the amplitude measurement error and the term in parentheses is the tracking sensitivity coefficient. This expression sets forth angular accuracy normalized to the antenna beamwidth as can be used in tracking analyses. A common limitation of these measurements is the thermal noise errors, e.g., the signal to noise ratio, and assuming that this error is the limiting factor in the measurement accuracy of the signal amplitudes at the offset positions, the tracking sensitivity has a broad optimum when the pattern level at the offset position is 4.3 dB lower than the main beam peak. In practical system designs, the received signal level is required to have a minimum signal to noise ratio to maintain signal fidelity requirements, e.g., a specified Bit Error Rate (BER) value. The angular offset can also be selected to maintain the required signal to noise levels for data fidelity requirements and, because the tracking sensitivity is a relatively broad optimum, a smaller angular offset can be used to assure the received data maintains the signal fidelity performance.

At this point, the antenna is aligned with the satellite and at step 518 a comparison can be made between the ephemeris trajectory and the actual trajectory. If the ephemeris trajectory proves to be accurate, then continuing to follow the ephemeris trajectory with occasional validation is adequate. The exemplary trajectory as depicted in FIG. 4 illustrates differences in the angular rates as the satellite passes the earth terminal. The sampling points can be selected to validate the trajectory depending on the angular rates so that the sampling is not uniform. The sampling time can be shorter during portions of the trajectory where the link dynamics are high. If deviations between the actual and estimated trajectories are determined, the sampling rates can be increased. The trajectory together with a link analysis can also be used to assess the need for further validation of trajectory correctness.

In an embodiment of the present invention, the sampling used also differs from the azimuth/elevation positioning used in conventional step tracking techniques. According to an embodiment of the present invention, positioning in the in-track and cross-track coordinates of the trajectory is used as antenna offsets and the in-track and cross-track coordinates offsets are used to determine tracking discrepancies, rather than azimuth/elevation offsets. Tracking discrepancies is less complex with the in-track and cross-track antenna offsets approach of the present invention because the azimuth/elevation errors are both coupled to the in-track and cross-track errors. Offsets in the cross-track are determined by open loop commanding the antenna about the cross-track direction. Such offsets produce an "S-shaped" variation about the trajectory and the signal level variations at the extremes of the S curve permit correction of any cross-track errors. These measurements can be readily accomplished as the antenna proceeds in its trajectory.

In-track validation of the antenna pointing involves correction for motion of the satellite, and two alternative techniques are now described. In one embodiment of the present invention, angular offsets for the in-track direction are compensated for the satellite motion during the repositioning and measurement time. The repositioning time greatly exceeds the measurement time. Thus, one technique is to open loop command the antenna ahead of the satellite and make a signal power measurement, and then open loop command the antenna behind the satellite correcting the offset for the amount the satellite would proceed in the in-track direction during the intervening time. A second technique is to open loop command the antenna in front of the satellite, and slow the trajectory letting the satellite traverse the in-track antenna pattern and realign the in-track coordinate based on power variations in the signal, similar to the approach used in the initial elevation tracking described above.

Figure 6:
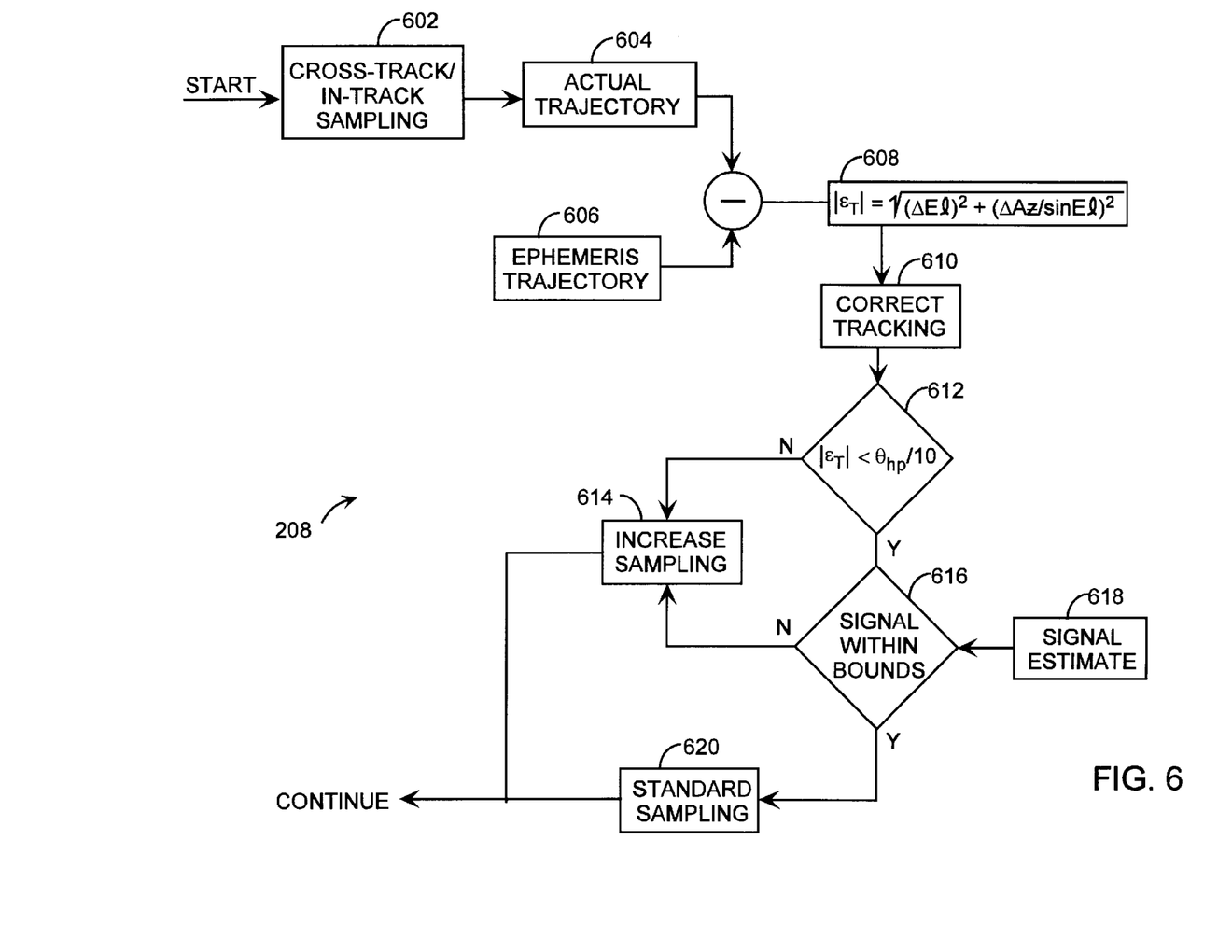
FIG. 6 is a flow diagram of an exemplary trajectory validation process according to the present invention.

FIG. 6 is a flow diagram of an exemplary trajectory validation process 208 according to the present invention. At step 602, angular sampling (e.g., cross-track and in-track) occurs. The actual and ephemeris trajectories 604 and 606 are differenced and the magnitude of the error is determined as indicated at executable block 608. The corrections can be used with an orbital perturbation program as well to assist tracking on this and subsequent orbits. In the initial acquisition, for example, the actual time and azimuth angle of the orbit are measured. These two data points provide inputs that can be used in such a perturbational procedure, e.g., if the pass follows the ephemeris generated trajectory by a 40 second time offset, at step 610 the estimated trajectory can be perturbed to correct for the errors observed in the rate corrected step track procedure. At decisional diamond 612, a determination is made as to whether the difference between the trajectories is sufficiently small. If the actual trajectory deviates from the ephemeris trajectory, at step 614 the angular sampling is increased to maintain antenna tracking and, subsequent to the satellite pass, the ephemeris values are examined and updated as appropriate. In addition to the comparison of received signal levels that provides an indication of tracking errors, the exemplary trajectory validation process 208 provides a way to assure that adequate signal strength is maintained. To this end, at decisional diamond 616, a determination is made as to whether the signal level is within expected bounds at that particular point along the trajectory. If the determination is negative, the sampling is also increased per step 614. If the ephemeris and actual trajectories agree closely and the signal level is within the expected bounds, then the angular sampling of the trajectory follows nominal preselected times, per standard sampling 620, with the process flow then continuing to the next sample point.

Figure 8:
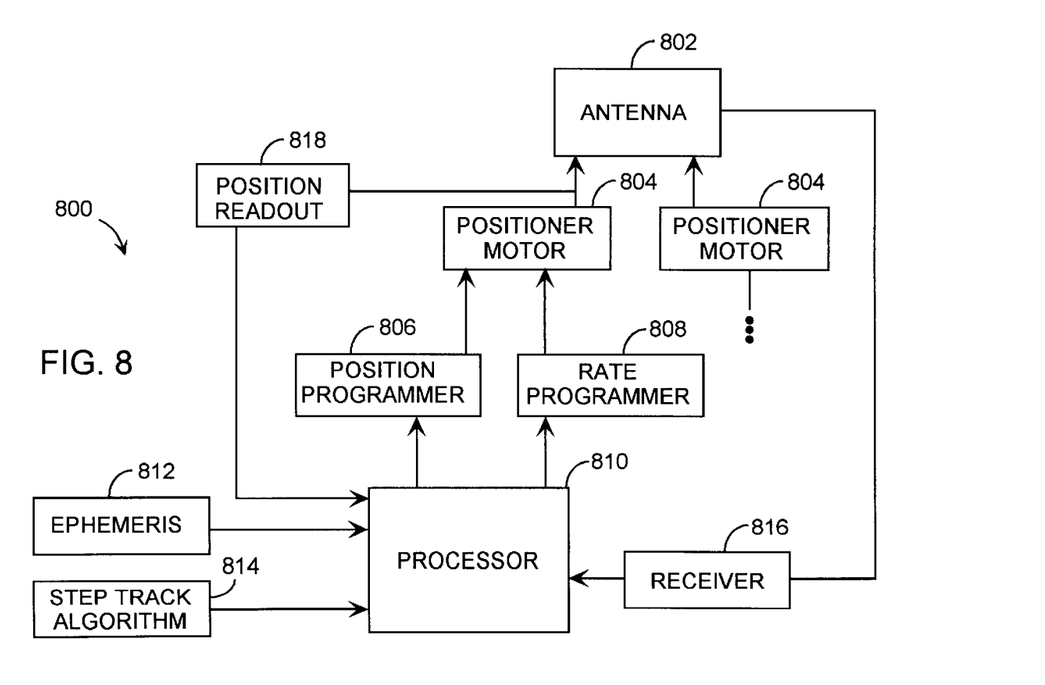
FIG. 8 is a functional diagram of an exemplary antenna control system according to the present invention.

FIG. 8 is a functional diagram of an exemplary antenna control system 800 according to the present invention. The antenna 802 has at least two positioner motors 804 which, under system command, drive the antenna to follow the signal direction trajectory. Each positioner motor 804 is controlled by both position and rate programmers 806, 808. Using both position and rate programmers is advantageous in following the dynamics of the signal variation. The rate programmer 808 provides the capability to respond quickly to the trajectory dynamics. Typically, the rate programmers are about three times more responsive than the position programmers. The use of both position and direction provides a way to accurately follow the more dynamic portion of the trajectory. In the illustrated system, the two programmers 806, 808 are directed by a processor 810. The processor 810 derives the estimated trajectory from the ephemeris 812 and also follows the rate corrected step track algorithm 814 as discussed above. In its operation, the processor 810 also uses received signal variations from the receiver 816 and position readout data 818.

Angular offsets specified by the step track algorithm are observed through received signal variations. These values, together with the above equation, facilitate determining the signal peak alignment. The signal peak alignment values together with the position and rate estimates from the ephemeris trajectory are used to project the tracking of the antenna through the position and rate programmers. The processor, by examining the position and rate estimated for the ephemeris trajectory, selects an appropriate sampling time interval for the step track verification, whereby portions of the trajectory with more dynamic signal trajectory variations are sampled more rapidly in time (i.e., at a higher rate).

In operation, the processor 810 observes deviations between the estimated ephemeris trajectory and the actual trajectory values derived from the step track measurement. Based on these deviations, an incremental increase in the rate programmer is made allowing the antenna to be more closely aligned with the actual signal position in subsequent step track verifications 212 (FIG. 2).

While the processor sample rate is generally determined based on source signal dynamics, it can also be increased to accommodate situations where deviations in the estimated trajectory are atypical, as might be encountered in certain difficult operating environments.

Although the exemplary antenna control system 800 shows two positioner motors, it should be appreciated that the principles of the present invention are not limited to AZ/EL positioners and are also applicable to systems employing a different number of motors and/or different positioner configurations, coordinate systems, gimbal configurations, etc.

Although the present invention has been described in terms of the embodiment(s) above, numerous modifications and/or additions to the above-described embodiment(s) would be readily apparent to one skilled in the art. For example, the tracking technique(s) disclosed herein also has(have) potential application to future user terminals and gateway stations in communication systems where orbits other than geostationary are used. It is intended that the scope of the present invention extends to all such modifications and/or additions.

We claim:

1. A method of tracking a signal from a moving signal source, comprising:
   processing variations in a received signal from a moving signal source to determine signal peak alignment values, the received signal being sampled in the spatial domain; and
   processing the signal peak alignment values and an a priori estimate of motion of the moving signal source to control an antenna with in-track acceleration commands to track the received signal.

2. The method of tracking a signal from a moving signal source of claim 1, wherein the a priori estimate of motion includes position and rate estimates from an estimated ephemeris trajectory.

3. The method of tracking a signal from a moving signal source of claim 1, wherein an open loop control system is used to control the antenna.

4. The method of tracking a signal from a moving signal source of claim 1, wherein a rate programmer is used to control the antenna.

5. The method of tracking a signal from a moving signal source of claim 4, wherein the rate programmer provides the in-track acceleration commands.

6. The method of tracking a signal from a moving signal source of claim 4, wherein differences between a measured trajectory and an estimated ephemeris trajectory are used to control the rate programmer.

7. The method of tracking a signal from a moving signal source of claim 1, further comprising:
   performing a tracking verification at a sample rate determined in consideration of the a priori estimate of motion, such that trajectory portions with more dynamic signal variations are sampled more frequently.

8. The method of tracking a signal from a moving signal source of claim 1, further comprising:
   using a step track measurement process to correct errors in the a priori estimate of motion.

9. A method of tracking a signal from a moving signal source, comprising:
   performing an initial acquisition of a signal from a moving signal source by
      positioning an antenna at a nominal azimuth angle and at an initial elevation angle relative to a horizon where the moving signal source is expected to appear, the initial elevation angle being selected such that a null between a main beam and a first sidelobe of the antenna is aligned with the horizon, and
      repositioning the antenna by providing azimuth offset commands corresponding to angular increments about the nominal azimuth angle and not providing elevation offset commands, until the signal has been acquired by a receiver of the antenna.

10. The method of tracking a signal from a moving signal source of claim 9, wherein the angular increments in the signal sampling are a portion of a beamwidth of the antenna dependent on a tracking sensitivity coefficient constrained by a signal margin.

11. The method of tracking a signal from a moving signal source of claim 9, further comprising:
   employing a guard antenna to verify a main beam acquisition.

12. A method of tracking a signal from a moving signal source, comprising:
   employing an open loop control system to steer an antenna by commanding angular offsets along and orthogonal to a direction of motion of a moving signal source.

13. The method of tracking a signal from a moving signal source of claim 12, wherein the open loop control system is configured to implement an open loop step track process.

14. A method of tracking a signal from a moving signal source, comprising:
   commanding angular offsets in in-track and/or cross-track coordinates to control an antenna to track a signal from a moving signal source taking into consideration directional changes of the signal and comparisons between actual and estimated trajectories of the moving signal source.

15. The method of tracking a signal from a moving signal source of claim 14, wherein a sampling of the angular offsets varies with a rate of change of signal direction.

16. The method of tracking a signal from a moving signal source of claim 14, wherein cross-track angular offsets are determined by open loop commanding the antenna about a cross-track direction.

17. The method of tracking a signal from a moving signal source of claim 14, wherein in-track angular offsets are determined by open loop commanding the antenna ahead of the moving signal source and making a signal power measurement, and then open loop commanding the antenna behind the moving signal source correcting the in-track angular offset for an amount the moving signal source would proceed in an in-track direction during the intervening time.

18. The method of tracking a signal from a moving signal source of claim 14, wherein in-track angular offsets are determined by open loop commanding the antenna in front of the moving signal source, and slowing a tracking speed to let the moving signal source traverse an in-track antenna pattern and realign the in-track coordinate based on power variations in the signal.

19. The method of tracking a signal from a moving signal source of claim 14, further comprising:
   spatially sampling the signal to validate a correctness of the estimated trajectory.

20. The method of tracking a signal from a moving signal source of claim 19, wherein the signal is sampled depending upon an angular rate associated with the estimated trajectory at a particular point along the estimated trajectory.

21. The method of tracking a signal from a moving signal source of claim 19, wherein the signal is sampled more frequently during portions of the estimated trajectory where signal trajectory dynamics are high.

22. The method of tracking a signal from a moving signal source of claim 19, wherein the signal is sampled more frequently if deviations between the actual and estimated trajectories are determined.

* * * * *